(12) United States Patent
Zock

(10) Patent No.: US 12,390,789 B2
(45) Date of Patent: Aug. 19, 2025

(54) TUBULAR KNITTED GEOTEXTILES IMPLEMENTING HYDROPHOBIC CELLULOSE BASED THREADS, METHODS OF MAKING THE SAME, AND EROSION SEDIMENT AND POLLUTION CONTROL PRODUCTS MADE FROM THE SAME

(71) Applicant: MKB Company, LLC, Groveport, OH (US)

(72) Inventor: Michael A. Zock, Saxonburg, PA (US)

(73) Assignee: MAZCON, A KURTZ BROS. COMPANY, LLC, Chicago, IL (US)

( * ) Notice: Subject to any disclaimer, the term of this patent is extended or adjusted under 35 U.S.C. 154(b) by 176 days.

(21) Appl. No.: 18/114,601

(22) Filed: Feb. 27, 2023

(65) Prior Publication Data

US 2023/0277966 A1    Sep. 7, 2023

Related U.S. Application Data

(63) Continuation of application No. PCT/US2021/047966, filed on Aug. 27, 2021.
(Continued)

(51) Int. Cl.
*B01J 20/24*    (2006.01)
*B01D 39/08*    (2006.01)
(Continued)

(52) U.S. Cl.
CPC ............ *B01J 20/24* (2013.01); *B01D 39/083* (2013.01); *B01J 20/18* (2013.01); *B01J 20/20* (2013.01); *B01J 20/2804* (2013.01); *B01J 20/2805* (2013.01); *E02D 17/202* (2013.01); *B01D 2239/0428* (2013.01); *B01D 2239/10* (2013.01);
(Continued)

(58) Field of Classification Search
CPC .......... B01D 39/083; B01D 2239/0428; B01D 2239/10; B01D 2239/1225; B01J 20/18; B01J 20/20; B01J 20/24; B01J 20/2804; B01J 20/2805; B01J 2220/44;
(Continued)

(56) References Cited

U.S. PATENT DOCUMENTS 2,079,779 A    5/1937  Tullis
2,201,279 A    5/1940  Willing
(Continued)

FOREIGN PATENT DOCUMENTS

EP      3385428 A1 * 10/2018 ............. D04H 3/013
WO      2022/047167      3/2022

*Primary Examiner* — Brian A McCaig
(74) *Attorney, Agent, or Firm* — Blynn L. Shideler; Krisanne Shideler; BLK Law Group

(57) ABSTRACT

An erosion, sediment and pollution control product comprises a geotextile which includes cellulose based threads treated to be hydrophobic and cellulose based filler within the tubular geotextile. The geotextile may be knitted and may include lyocell threads and wherein the lyocell threads are treated to be hydrophobic, and are treated with food grade mineral oil. A method of making a tubular knitted geotextile comprises the steps of: supplying cellulose based threads to a circular knitting machine and knitting a tubular substrate, treating the cellulose based threads with one of mineral oil, beeswax, paraffin, petroleum jelly, lanolin, plant-based oils, and combinations thereof, whereby the threads are rendered hydrophobic.

15 Claims, 3 Drawing Sheets

Related U.S. Application Data

(60) Provisional application No. 63/070,891, filed on Aug. 27, 2020.

(51) Int. Cl.
    *B01J 20/18*     (2006.01)
    *B01J 20/20*     (2006.01)
    *B01J 20/28*     (2006.01)
    *E02D 17/20*     (2006.01)

(52) U.S. Cl.
    CPC ... *B01D 2239/1225* (2013.01); *B01J 2220/44* (2013.01); *E02D 2300/0082* (2013.01); *E02D 2300/0085* (2013.01)

(58) Field of Classification Search
    CPC .................. E02B 3/125; E02D 17/202; E02D 2300/0082; E02D 2300/0085
    See application file for complete search history.

(56) References Cited

U.S. PATENT DOCUMENTS

| | | |
|---|---|---|
| 3,957,098 A | 5/1976 | Hepworth et al. |
| 4,044,525 A | 8/1977 | Forsgren |
| 5,595,458 A | 1/1997 | Grabhorn |
| 6,109,835 A | 8/2000 | Grabhorn |
| 7,226,240 B2 | 6/2007 | Tyler |
| 7,303,084 B2 | 12/2007 | McPhillips |
| 7,422,682 B2 | 9/2008 | McPhillips |
| 7,449,105 B2 | 11/2008 | Hastings |
| 7,654,292 B2 | 2/2010 | Sweningson |
| 8,821,076 B2 | 9/2014 | Tyler |
| 10,603,608 B2 | 3/2020 | Zock et al. |
| 10,745,881 B2 | 8/2020 | Zock et al. |
| 2009/0308769 A1 | 12/2009 | Mutter |
| 2015/0047298 A1 | 2/2015 | Szebalskie, Sr. et al. |
| 2016/0279541 A1 | 9/2016 | Zock et al. |
| 2018/0119334 A1* | 5/2018 | Netravali ................ C08B 15/05 |
| 2019/0388806 A1 | 12/2019 | Zock et al. |

\* cited by examiner

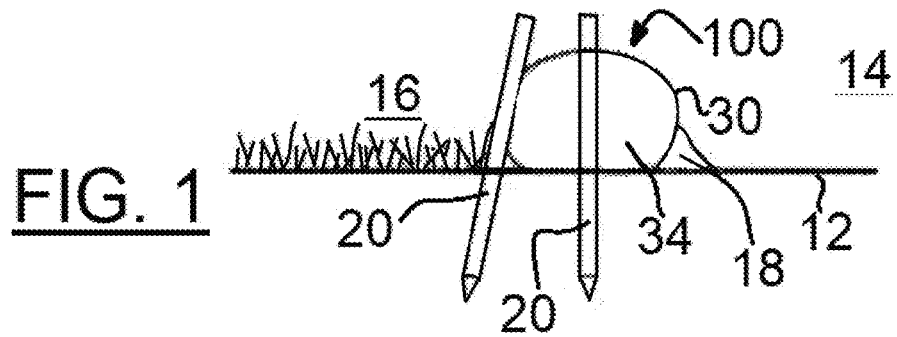
FIG. 1
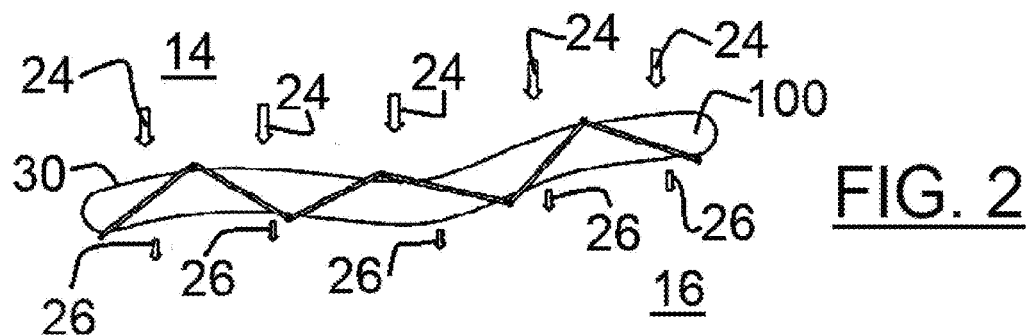
FIG. 2
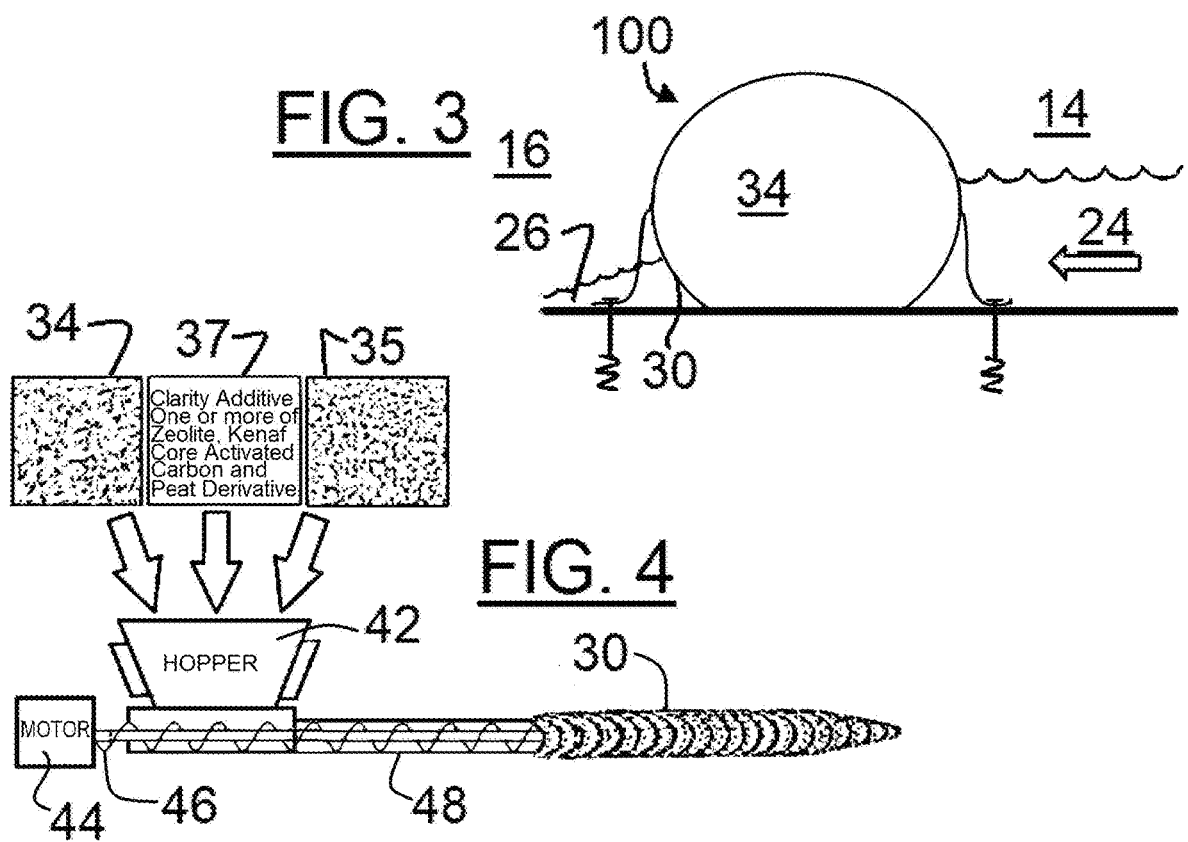
FIG. 3
FIG. 4

TUBULAR KNITTED GEOTEXTILES IMPLEMENTING HYDROPHOBIC CELLULOSE BASED THREADS, METHODS OF MAKING THE SAME, AND EROSION SEDIMENT AND POLLUTION CONTROL PRODUCTS MADE FROM THE SAME

RELATED APPLICATIONS

This application is a continuation of International Patent Application PCT/US2021/047966 filed Aug. 27, 2021 and published Mar. 3, 2022 as publication number WO 2022/047167, which application and publication are incorporated herein by reference. of International Patent Application PCT/US2021/047966 claims priority to U.S. Patent Application Ser. No. 63/070,891, filed Aug. 27, 2020 titled "Erosion and Sediment and Pollution Control Products Using Heat Treated Rice Hulls and/or Geotextiles Implementing Hydrophobic Cellulose Based Threads" which is incorporated herein by reference.

BACKGROUND INFORMATION

1. Field of the Invention

The present invention relates to tubular knitted geotextiles implementing hydrophobic cellulose based threads, methods of making the same and erosion, sediment and pollution control products made therefrom, such as, but not limited to, filter socks.

2. Background Information

A filter sock (also called a compost filter sock, compost filter sleeve, silt sleeve, filter sock, compost filter tube, compost mesh sleeve, or similar terms) is a type of contained compost filter berm. A filter sock is a mesh tube or netting containment member or sleeve filled with mostly biodegradable cellulose based filler material, often called compost material, and that is conventionally placed perpendicular to sheet-flow runoff primarily to control erosion and retain sediment in disturbed areas. Filter socks are known to remove pollution from runoff as well. The phrase "filter sock" is used herein to be inclusive of a containment member, generally tubular, filled at least partially with cellulose based filler material in a filtering type matrix and includes straw waddles, switchgrass filled cock product, weighted sediment tubes, coir logs and road wattles.

The concept of a filter sock formed as a mesh tube filled with cellulose based filler goes at least as far back as the mid 1930's in U.S. Pat. Nos. 2,079,779 and 2,201,279, by Mr. Willing, which are incorporated herein by reference. These early teaching disclosed the use of brush or bundled weeds (also called straw) as the compost filler.

Improvements in filter socks are shown in, for example U.S. Pat. Nos. 3,957,098, 4,044,525, 5,595,458, 6,109,835 7,303,084, 7,226,240, 7,422,682, 7,449,105, 8,821,076, and 10,603,608. For a more detailed background on filter socks in general see U.S. Patent Publications 2016-0279541 and 2015-0047298, which are incorporated herein by reference. Some of the people and associated entities doing work in the evolution, proliferation of the modern filter sock are John Engwer at FilterMitt, Kevin Lane at Lane ECS, Tom Truelsen at Soil Tek, Rod Tyler at Filtrexx, Keith and Kevin Weaver at Weaver Express, and Doug Cadwell at River Valley Organics. Today's filter sock is a modern-day version of the original Willing patented device.

Blower trucks have been used for mobile in-situ filling of filter socks. Blower trucks represent a considerable expense and are not applicable for all terrains. Additionally, a portable hopper and auger feeder design has been used for in-situ construction of filter socks. A conventional auger system is shown in U.S. Pat. No. 7,654,292, which is incorporated herein by reference. See also U.S. Patent Publication 2019-0388806, which is incorporated herein by reference.

The reference to the cellulose based filler material within the containment sleeve of a filter sock as "compost material" has caused some confusion in the art. The phrase can be used to reference that the filler material has undergone a certain amount of composting prior to being placed in the containment member or sleeve, or alternatively can be used to describe the biodegradable aspect of the material after it has entered the containment member or sleeve. The industry often utilizes freshly chipped or ground wood products as "compost material" without any designated pre-filling composting time. The industry also utilizes biodegradable products that actually have undergone some composting prior to use as a filler in a filter sock. Due to this confusion the present application refrains from referencing filter socks as "compost filter socks".

A large variety of materials have been proposed for forming the containment member for cellulose filler material in erosion, sediment and pollution control products, like filter socks. Natural or cellulose based fiber nettings have been proposed including those formed of cotton and burlap (typically jute or hemp), however, in filter socks the plastic netting dominates the market because of the needed longevity as well as cost considerations. This use of plastic for netting does have an environmental impact, for example the applicant is a leading manufacturer of filter socks with plastic netting sleeves and it has estimated that they will utilize enough plastic netting to manufacture 50 million water bottles in 2020 alone.

The international Search report of International Patent Application PCT/US2021/047966 identified U.S. Patent Publication 2009-0308769 by Carriff Engineered Fabrics Corporation; Chinese Patent Publication 210636371 by Shelwater Xiamen Eco-technology Co. LTD; Chinese Patent Publication 108589743 by Chongqing University Industrial Technology Research Institute; and Russian Patent Publication 2321982 by Rjazanov Aleksandr Viktorvich et al, as all being documents defining the general state of the art which is not considered to be of particular relevance.

Natural fiber based netting/containment members that yield viable field times would substantially reduce this reliance on plastic and yield environmental benefits. The natural fiber based netting/containment members proposed to date have proven insufficient.

SUMMARY OF THE INVENTION

One aspect of this invention is directed to an erosion, sediment and pollution control product comprising a geotextile which includes cellulose based threads treated to be hydrophobic and cellulose based filler within the tubular geotextile.

One aspect of the invention provides a tubular geotextile including implementing hydrophobic cellulose based threads. The geotextile according to the present invention may provide wherein the cellulose based threads include lyocell threads and the geotextile is knitted. The geotextile according to the invention may provide wherein the lyocell threads are treated to be hydrophobic, and are treated with food grade mineral oil.

One aspect of the invention provides a method of making a tubular knitted geotextile comprising the steps of: supplying cellulose based threads to a circular knitting machine and knitting a tubular substrate, treating the cellulose based threads with one of mineral oil, beeswax, paraffin, petroleum jelly, lanolin, plant-based oils, and combinations thereof, whereby the threads are rendered hydrophobic.

The features that characterize the present invention are pointed out with particularity in the claims which are part of this disclosure. These and other features of the invention, its operating advantages and the specific objects obtained by its use will be more fully understood from the following detailed description in connection with the attached figures.

BRIEF DESCRIPTION OF THE FIGURES

FIG. 1 is a schematic cross sectional illustration of an erosion, sediment and pollution control product including a tubular knitted geotextile implementing hydrophobic cellulose based threads in accordance with one aspect of the present invention;

FIG. 2 is a schematic top plan view illustration of the erosion, sediment and pollution control product of FIG. 1 with an alternative anchoring system;

FIG. 3 is a cross sectional illustration of the erosion, sediment and pollution control product of FIG. 2;

FIG. 4 is a schematic illustration of an auger filling device for forming the of the erosion, sediment and pollution control product of FIGS. 1-3 according to the present invention;

DESCRIPTION OF THE PREFERRED EMBODIMENTS

Figure 5:
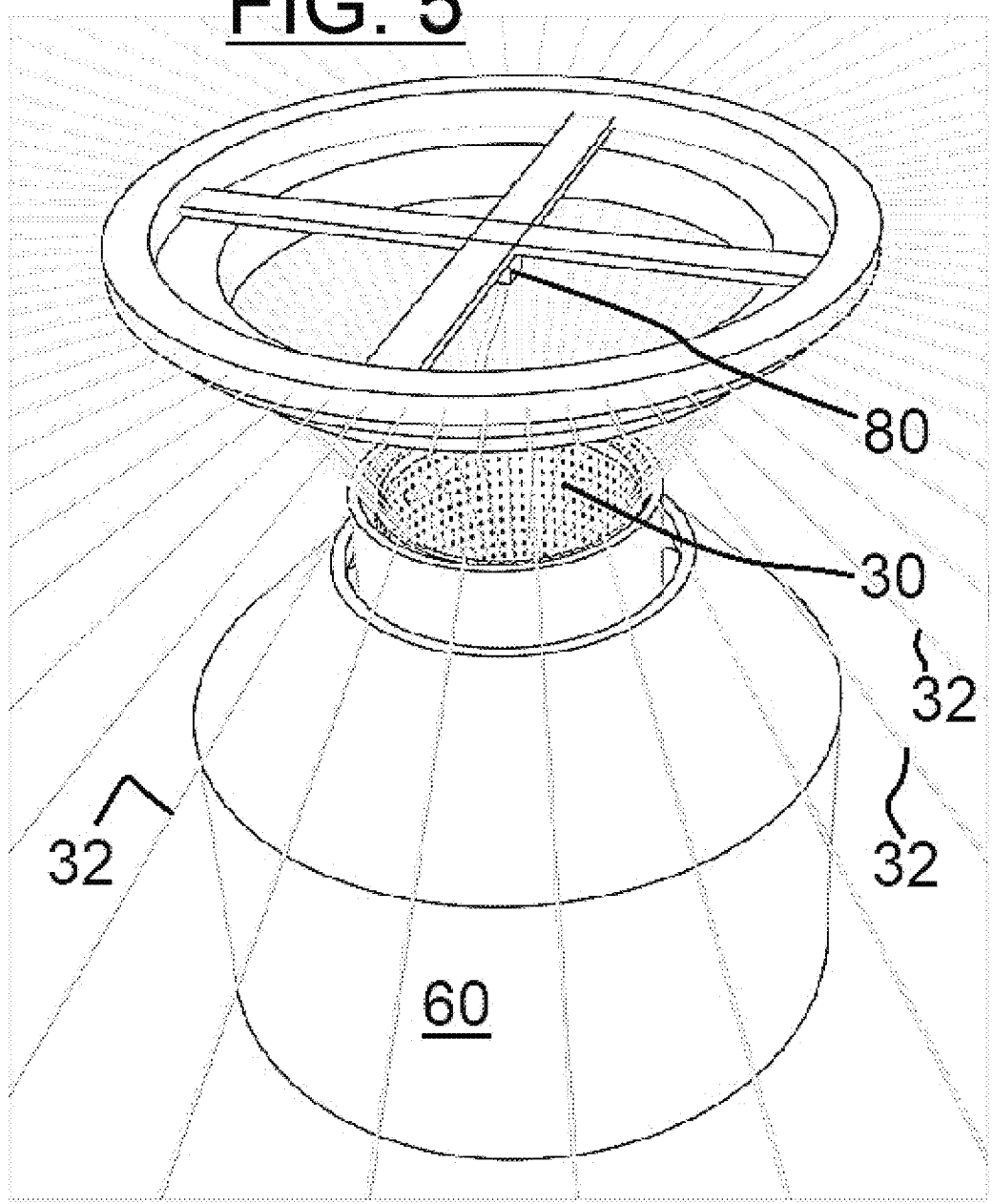
FIGS. 5-7 schematically illustrate a circular knitting machine forming the tubular knitted geotextile used in the erosion, sediment and pollution control product of FIGS. 1-3 and including a spraying unit for treating the cellulose based threads in accordance with one aspect of the present invention.

The present invention relates to tubular knitted geotextiles 30 implementing hydrophobic cellulose based threads 32, methods of making the tubular knitted geotextiles 30 and erosion, sediment and pollution control products made therefrom, such as, but not limited to, filter socks 100.

FIG. 1 is a schematic illustration of an erosion, sediment and pollution control product including a tubular knitted geotextile 30 implementing hydrophobic cellulose based threads 32 in accordance with one aspect of the present invention, in which the product is a filter sock 100. FIG. 2 is a schematic top plan view illustration of the erosion, sediment and pollution control product of FIG. 1 with an alternative anchoring system using straps such as disclosed in U.S. Patent Publication 2019-0176059 which is incorporated herein by reference and FIG. 3 is a cross sectional illustration of the erosion, sediment and pollution control product of FIG. 2. The upstream side 14 is the side of water runoff or flow 26 whereas the downstream side (AKA undisturbed side) 16 is the side having filtered water flow 26.

There are several advantages the filter sock 100 has over traditional sediment control tools, such as a silt fence, including that i) installation does not require disturbing the soil surface (no trenching), which reduces erosion; ii) it is easily removed and/or moved, if required; iii) reduces the use of plastic over conventional filter socks; and iv) the operator likely will not need to dispose of any material following implementation. These advantages lead to cost savings, either through reduced labor or disposal costs.

Further, the use of cellulose based filler or filter material 34 (often called compost, sometimes inaccurately, as noted above) provides additional benefits. The filler 34 retains a large volume of water, which helps prevent or reduce rill erosion and aids in establishing vegetation on the filter sock 100. The mix of particle sizes in the filter material 34 retains as much, or more, sediment than traditional perimeter controls, such as silt fences or hay bale barriers, while allowing a larger volume of clear water 26 to pass through. Silt fences often become clogged with sediment and form a dam that retains storm-water, rather than letting the filtered storm-water pass through. In addition to retaining sediment, cellulose based fillers 34 can retain pollutants such as heavy metals, nitrogen, phosphorus, oil and grease, fuels, herbicides, pesticides, and other potentially hazardous substances—improving the downstream 16 water quality. Nutrients and hydrocarbons adsorbed and/or trapped by the filter sock 100 can be naturally cycled and decomposed through bioremediation by microorganisms commonly found in the filler 34 matrix.

Filter socks 100 are applicable to construction sites or other disturbed areas 14 (also called upstream side) where storm-water runoff occurs as sheet flow. Common industry practice for such filter devices is that drainage areas do not exceed 0.25 acre per 100 feet of device length and flow does not exceed one cubic foot per second. Filter socks 100 can be used on steeper slopes with faster flows if they are spaced more closely, stacked beside and/or on top of each other, made in larger diameters, or used in combination with other storm-water controls, such as compost blankets.

Filter socks 100 offer a large degree of flexibility for various applications. A large number of qualitative studies have reported the effectiveness of filter socks 100 in removing "settle-able" solids and total suspended solids from storm-water. These studies have consistently shown that filter socks 100 are generally more effective than traditional erosion and sediment control systems. Filter socks 100 are often used in conjunction with compost blankets to form a storm-water management system. Together, these two systems retain a very high volume of storm-water, sediment, and other pollutants.

Once the filter sock 100 is filled with filler 34 and put in place, it should be anchored to the slope. One well established anchoring method is to drive stakes 20 through the sock 100 at regular intervals; alternatively or in addition, stakes 20 can be placed on the downstream side 16 of the sock 100. As an alternative straps such as shown in FIGS. 2-3 can be used to anchor the sock 100 in place. The ends of the filter sock 100 may be directed upslope, to prevent storm-water from running around the end of the sock 100. The filter sock 100 may be vegetated by incorporating seed into the cellulose based filler 34 prior to placement in the filter sock 100. Since filter socks 100 do not have to be trenched into the ground 12, they can be installed on frozen ground or even on cement or other "inhospitable" surfaces.

FIG. 4 is a schematic illustration showing the manufacture of erosion, sediment and pollution control product in the form of a filter sock 100 comprising a cellular based filler material 34 in accordance with one aspect of the present invention. Specifically, FIG. 4 shows the use of a known hopper 42 fed mixing auger 46 powered by motor 44 for forming products 100. The cellulose based filler 34 is conveyed to the hopper 42, such as by gravity or pneumatically. Any known cellulose based filler can be utilized, including mixes thereof in a blended arrangement. See for example U.S. Patent Publication 2019-03889806, which is incorporated herein by reference. Other non-cellulose based materials may selectively be added, such as, for a representative example, a clarity additive 37 or weighting material 35 (such as gravel), which material if present is conveyed to the hopper 42 via gravity or feeding belt or the like.

The hopper 42 may include devices to assist the feeding such as vibrators. The use of a gravity feed hopper 42 with vibration from vibrators are sufficient to preliminary mix the filler 34 with other constituents (e.g., the clarity additive 37 and/or the weighting material 35) for delivery to a conveying-mixing auger 46 driven by motor 44. The auger 46 will convey and mix the filler 34 and other constituents if present to form a blended generally homogeneous mixture before it is deposited within the tubular knitted geotextile 30 implementing hydrophobic cellulose based threads 32 to form the product or sock 100 of the invention. A sleeve of the tubular knitted geotextile 30 is on the outlet tube 48 of the conveying-mixing auger 46 and a leading end of the tubular knitted geotextile 30 is pulled off of the outlet tube and sealed by a tying mechanism or closing mechanism. Simply knotting the end is typically sufficient for forming the seal or closure, but bands, clips, fastener may be used as well. When a sufficient length of material of tubular knitted geotextile 30 has been filled with the blended filler material 34 (+optional additives) and the product 100 of the invention is the desired length for the intended usage, then the proximal end will be sealed, generally in the same method as the leading closure. The tubular knitted geotextile 30 may be cut so that multiple products 100 may be formed from one sleeve of tubular knitted geotextile 30 or the sleeve may be sized to form the necessary length of a single product.

Where the tubular knitted geotextile 30 is cut to form multiple products or socks 100 from one sleeve of tubular knitted geotextile 30, the proximal end of one sleeve of tubular knitted geotextile 30 may be reached before the end of that desired length of the product 100 being formed, in which case the filling process is halted and a new sleeve of tubular knitted geotextile 30 is placed onto the outlet tube 48 by feeding the outlet tube 48 and the partially formed product 100 through the new sleeve of tubular knitted geotextile 30. The leading end of the tubular knitted geotextile 30 is overlapped with the trailing end of the prior sleeve while the trailing end is still on the outlet tube 48 and the overlapped portions are coupled together such as with a few zip-ties or the like. With the new sleeve of tubular knitted geotextile 30 thus positioned the process resumes.

The product or sock 100 is generally palletized for shipment, but could be made in the field. Palletizing the product 100 is simply coiling the product on a shipping pallet, which may then be wrapped in a containment wrap for shipping. These containment wraps are often plastic, but alternative materials can be used and yield greener solutions for packaging and shipping.

The tubular knitted geotextile 30 is known as a tubular mesh or netting material and must have opening that are sufficient to contain filler material 34 (together with other additives that may be present). A tubular knitted geotextile 30 is sufficient to contain the filler material 34 where less than 1% of the filler material 34 pass through the tubular knitted geotextile 30 of the product or sock 100 after 30 seconds of vigorous shaking of the filled product 100. Products 100 do not exhibit loss of filler 34 from tubular knitted geotextile 30 in the field where they pass this simple manual containment test.

The tubular knitted geotextile 30 preferably exhibits a fabric flow test of at least 100 Gallons per minute based upon the permittivity test results in the ASTM 4491 type C testing protocol (as this testing protocol exists as of Aug. 27, 2020). Permittivity is a laboratory-measured characteristic of the geotextile, expressing the flow capacity of the geotextile per unit of head. American Society for Testing and Materials (ASTM) D-4491, "Standard Test Methods for Water Permeability of Geotextiles by Permittivity" is the industry standard method for measuring geotextile permittivity, and this application is referencing the test as of Apr. 27, 2020. This standard test is an index test and measures water flow rate through a geotextile in an isolated condition. Once permittivity is known, the flow capacity of the geotextile can be calculated for given thickness of geotextile. The tubular knitted geotextile 30 preferably exhibits a fabric flow test of between 100 and 700 Gallons per minute, and more preferably 200-400 Gallons per minute based upon the permittivity test results in the ASTM 4491 type C testing protocol.

The tubular knitted geotextile 30 is a geotextile which includes cellulose based threads 32 treated to be hydrophobic. The natural cellulosic fibers include cotton, flax, hemp, jute, and ramie. The major man-made cellulosic fiber is rayon, a fiber produced by regeneration of dissolved forms of cellulose.

One preferred cellulose based thread 32 used in the present invention is lyocell, which is a form of rayon that consists of cellulose fiber made from dissolving pulp (bleached wood pulp) using dry jet-wet spinning. Lyocell was developed in 1972 by a team at the now defunct American Enka fibers facility at Enka, North Carolina. The U.S. Federal Trade Commission defines lyocell as a fiber "composed of cellulose precipitated from an organic solution in which no substitution of the hydroxyl groups takes place and no chemical intermediates are formed" and this definition is implemented herein. Lyocell threads 32 that are treated to be hydrophobic represent a cost-effective choice of fiber for forming the tubular knitted geotextile 30. The preferred lyocell threads 32 for forming the present invention have a fiber length less than 4" and generally between 10 mm to 40 mm. The preferably singly ply lyocell gauge or weight is 3-1 to 12-1, more preferably 4-1 to 9-1 and most preferably 6-1. These measurements are standard "weight per unit length/ply" gauge for lyocell threads 32. A double ply lyocell thread 32 may also be used in the present invention which will have the analogous gauge range of 6-2 to 24-2, more preferably 8-2 to 18-2 and most preferably 12-2. It is also possible for a three ply lyocell thread 32 to be utilized which will have the analogous gauge range of 9-3 to 36-3, more preferably 12-3 to 27-3 and most preferably 36-3.

The cellulose-based threads tend to be hydrophilic and this can lead to premature degradation of the fabrics in the field for products 100. In the present invention the cellulose-based threads of tubular knitted geotextile 30 are treated to be hydrophobic, and may be treated with one of mineral oil, beeswax, paraffin, petroleum jelly, lanolin, plant-based oils, and combinations thereof.

Figure 6:
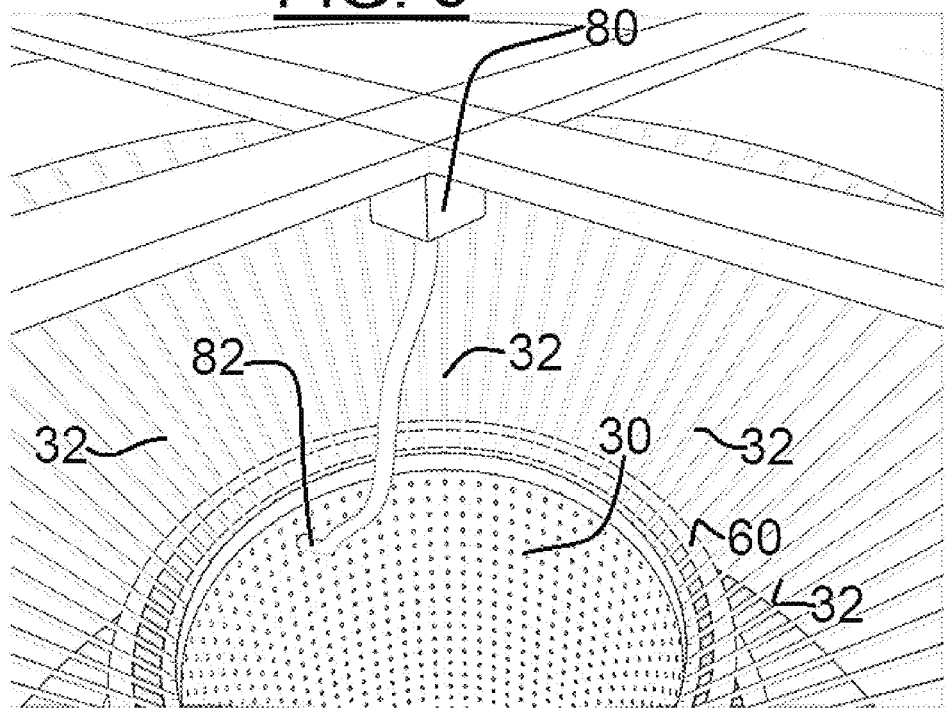
Figure 7:
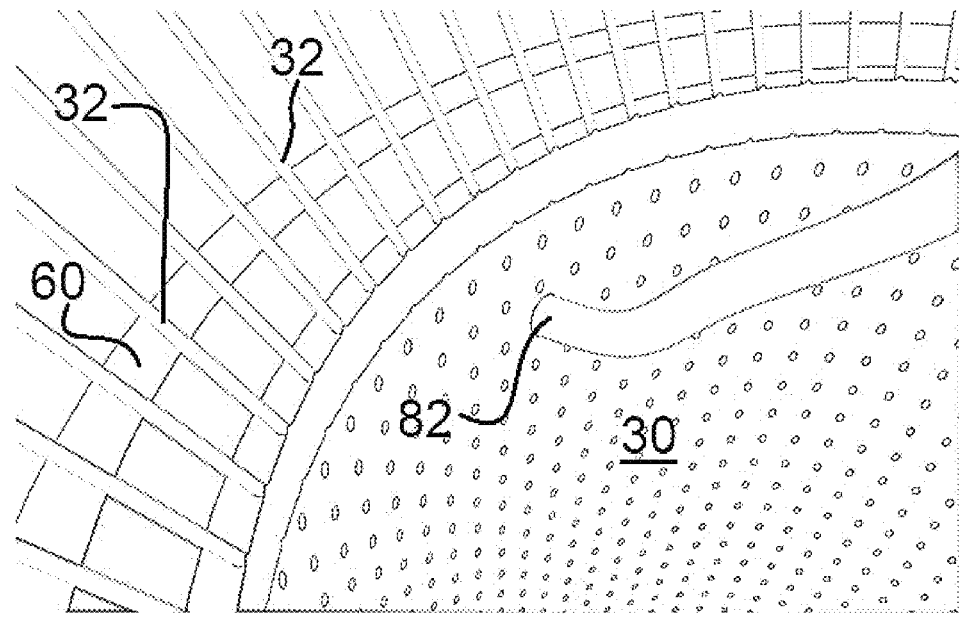

A preferred treatment for the threads 32 is with food grade mineral oil. The mineral oil preferably has a viscosity of greater than 70 SUS, more preferably greater than 90 SUS and most preferably 120-130 SUS. The preferred method of treating the threads 32 is inside the circular knitting machine 60. FIGS. 5-7 schematically illustrate a circular knitting machine 60 forming the tubular knitted geotextile 30 used in the erosion, sediment and pollution control product or sock 100 of FIGS. 1-3. The circular knitting machine is generally known to those in the art and is not shown in detail. Circular knitting machines always produce a tube-shaped fabric, wherein the needles and sinkers in these machines are arranged in a circle. The cellulose threads 32 are fed to the machine which forms the tubular geotextile 30. The machine 60 includes a spraying unit 80 with a spray nozzle 82 below the needles which can supply the treatment to the threads 32 to form the hydrophobic threads 32 in the geotextile 30 of the present invention. A suitable spray unit is available from Unist, Inc. Where mineral oil discussed above is used, the treatment according to the present invention is generally a spraying or misting of the surface of the textile 30 below 2 oz. per square foot of geotextile 30, generally between about 0.1 and 1.5 oz. per square foot of geotextile.

Vitamin E may be added to the mineral oil as it is an antioxidant and can retard degradation of the geotextile. Additionally a scent and/or dye may be added to the mineral oil to provide olfactory and/or visual indication of geotextile treatment of the geotextile 30 and threads 32.

Untreated cotton thread (of analogous gauge to the lyocell threads above) may be used in the circular knitting machine 60 with the spray unit 80 used to treat the cotton threads with an agent such as food grade mineral oil. The mineral oil preferably has a viscosity of greater than 70 SUS, more preferably greater than 90 SUS and most preferably 120-130 SUS.

Alternatively waxed cotton is an example of a commercially available cellulose-based thread which has already been treated to be hydrophobic. Waxed cotton is cotton impregnated with a paraffin or natural beeswax based wax, woven into or applied to the cloth. Waxed cotton was popular from the 1920s to the mid-1950s and was developed from the sailing industry in England and Scotland. "Waxed thread" is also a known commercial product and defines any thread type that includes a light coating of wax and generally used for hand stitching leather and canvas, the phrase waxed thread is not limited to cellulose based threads, and thus broader than the scope of the present invention. Commercially available waxed cotton or commercially available cellulose based waxed threads could be used in the formation of the geotextile 30 but may require alteration of the conventional knitting machine 60 to accommodate such threads.

Using one of, or combinations of cellulose based threads treated to be hydrophobic to form the tubular textile 30 results in a reduction of the use of plastic in the product 100 and is generally favorable to the environment. Treating the cellulose-based threads 32 to be hydrophobic, such as with treatments with at least one of mineral oil, beeswax, paraffin, petroleum jelly, lanolin and plant-based oils, is believed to increase the longevity of the product in the field to 100-1500% of the effective life of untreated threads in products 100.

The present invention is not limited to filter socks. The cellulose-based threads treated with material to make them hydrophobic may be implemented in rolled erosion control blanketing, silt fence edging, and mainly in any erosion, sediment and pollution control product where longevity and bio-degradation are desired.

While the invention has been shown in several particular embodiments it should be clear that various modifications may be made to the present invention without departing from the spirit and scope thereof. The scope of the present invention is defined by the appended claims and equivalents thereto.

What is claimed is:

1. A tubular geotextile including implementing hydrophobic cellulose based threads, wherein the cellulose based threads include lyocell threads and the geotextile is knitted, and wherein the lyocell threads are at least one of i) comprising a fiber length between 10 mm to 40 mm, ii) comprising single ply within the range of 3-1 to 12-1, iii) comprising double ply within the range of 6-2 to 24-2, and iv) comprising triple ply within the range of 9-3 to 36-3, and v) treated to be hydrophobic, and are treated with food grade mineral oil.

2. The geotextile according to claim 1 wherein the lyocell threads have a fiber length between 10 mm to 40 mm.

3. The geotextile according to claim 1 wherein the lyocell threads are one of i) single ply within the range of 3-1 to 12-1, ii) double ply within the range of 6-2 to 24-2, and iii) triple ply within the range of 9-3 to 36-3.

4. The geotextile according to claim 1 wherein the lyocell threads are treated to be hydrophobic, and are treated with one of mineral oil, beeswax, paraffin, petroleum jelly, lanolin, plant-based oils, and combinations thereof.

5. The geotextile according to claim 1 wherein the lyocell threads are treated to be hydrophobic, and are treated with food grade mineral oil.

6. The geotextile according to claim 5 wherein the mineral oil includes vitamin E.

7. A method of making a tubular knitted geotextile comprising the steps of:
Supplying cellulose based threads to a circular knitting machine and knitting a tubular substrate,
Treating the cellulose based threads with one of mineral oil, beeswax, paraffin, petroleum jelly, lanolin, plant-based oils, and combinations thereof, whereby the threads are rendered hydrophobic.

8. The method of making a tubular knitted geotextile according to claim 7 wherein the cellulose based threads include lyocell threads.

9. The method of making a tubular knitted geotextile according to claim 8 wherein the lyocell threads have a fiber length between 10 mm to 40 mm, and wherein the lyocell threads are one of i) single ply within the range of 3-1 to 12-1, ii) double ply within the range of 6-2 to 24-2, and iii) triple ply within the range of 9-3 to 36-3.

10. The method of making a tubular knitted geotextile according to claim 7 wherein the mineral oil includes vitamin E.

11. An erosion, sediment and pollution control product comprising:
A tubular geotextile including implementing hydrophobic cellulose based threads; and
A cellulose based filler within the tubular geotextile.

12. The erosion, sediment and pollution control product according to claim 11 wherein the tubular geotextile exhibits a fabric flow test of at least 100 gallons per minute as derived from the ASTM 4491 type C test.

13. The erosion, sediment and pollution control product according to claim 11 wherein the cellulose based threads include lyocell threads.

14. The erosion, sediment and pollution control product according to claim 13 wherein the lyocell threads have a fiber length between 10 mm to 40 mm, and wherein the lyocell threads are one of i) single ply within the range of 3-1 to 12-1, ii) double ply within the range of 6-2 to 24-2, and iii) triple ply within the range of 9-3 to 36-3.

15. The erosion, sediment and pollution control product according to claim 13 wherein the geotextile is knitted.

\* \* \* \* \*